United States Patent [19]

Dai et al.

[11] Patent Number: 5,370,788
[45] Date of Patent: Dec. 6, 1994

[54] WAX CONVERSION PROCESS

[75] Inventors: Pei-Shing E. Dai, Port Arthur; Joseph A. Durkin, Groves; Bobby R. Martin, Beaumont, all of Tex.

[73] Assignee: Texaco Inc., White Plains, N.Y.

[21] Appl. No.: 992,669

[22] Filed: Dec. 18, 1992

[51] Int. Cl.$^5$ .................. C10G 73/38; C10G 47/20
[52] U.S. Cl. .................... 208/111; 208/24; 208/27; 208/46; 208/59
[58] Field of Search ............... 208/27, 110, 137, 112, 208/111; 502/257, 313

[56] References Cited

U.S. PATENT DOCUMENTS

| | | | |
|---|---|---|---|
| 3,803,028 | 4/1974 | Mead et al. | 208/112 |
| 3,896,025 | 7/1975 | Coleman et al. | 208/18 |
| 4,648,958 | 3/1987 | Ward | 208/110 |

*Primary Examiner*—Paul Lieberman
*Assistant Examiner*—Lorna M. Douyon
*Attorney, Agent, or Firm*—Carl G. Seutter; Kenneth R. Priem; Cynthia L. Kendrick

[57] ABSTRACT

Charge waxy hydrocarbon is converted to lube oil base stock by hydrotreating in the presence of catalyst characterized by its ability to convert a waxy hydrocarbon distillate of high pour point to a hydrocarbon product of reduced pour point and high viscosity index, suitable for use as a lube oil base stock, which comprises a support containing about 2–50 w % silica and 50–98 w % alumina, bearing 2–10 w % of a non-noble Group VIII metal, as metal, metal oxide, or metal sulfide, about 8–20 w % of a Group VI-B metal, as metal, metal oxide, or metal sulfide, less than 0.5% halogen; and 0–2 w % of phosphorus, the atom ratio of Group VIII metal to Group VI-B metal being about 0.3–2:1, said catalyst being characterized by a micropore mode of about 60–130 Å diameter, a Total Surface Area of about 150–300 m$^2$/g, a Total Pore Volume of about 0.45–0.9 cc/g and a Pore Volume of pores with pore diameter >500 Å of about 0.02–0.25 cc/g.

7 Claims, No Drawings

WAX CONVERSION PROCESS

FIELD OF THE INVENTION

This invention relates to a wax conversion process. More particularly it relates to a process for converting a waxy hydrocarbon feedstock of high pour point to a hydrocarbon product of reduced wax content and high viscosity index which is particularly suitable for use as an automatic transmission fluid, premium motor oil, etc. The product oil is particularly characterized by very good low temperature properties and by a high viscosity index.

BACKGROUND OF THE INVENTION

As is well known to those skilled in the art, suitable heavier hydrocarbons may be employed as charge stock for various products including lubricating oils, automatic transmission fluids, etc. Commonly, however, it is found that the charge stocks need considerable processing in order to make them suitable as a base oil for such uses. Various processes may be employed to convert these charge oils into base stocks characterized by decreased wax content, decreased pour point, decreased aromatics content, etc.

There is a large body of literature and patents which addresses this area. Typical of these are the following:

Bijward, H. M. J. et al *The Shell Hybrid Process, an Optimized Route for HVI (High Viscosity Index) Lube Oil Manufacture* paper from Pet. Ref. Conf. of the Jap. Pet. Inst Oct. 27-28, 1986, p16;

Bulls, S. et al *Lube oil Manufacture by Severe Hydrotreatment* Proc. Tenth World Pet. Congress Vol 4, 1980 p221-8.

U.S. Pat. No. 3,268,439
U.S. Pat. No. 3,658,689
U.S. Pat. No. 3,764,516
U.S. Pat. No. 3,830,723
U.S. Pat. No. 4,547,283
U.S. Pat. No. 4,900,711
U.S. Pat. No. 4,911,821
EUR 0 321 299
EUR 0 321 302
EUR 0 335 583
BRIT 1,098,525

Continuing studies are in progress in an attempt to improve the quality of base stocks so that they may be employed as premium motor oils, transmission fluids, etc.

It is an object of this invention to provide a process for treating a waxy hydrocarbon such as slack wax to convert it into a product oil containing decreased content of normal paraffins and increased content of isoparaffins. It is another object of this invention to provide a catalyst characterized by the substantial absence of halogens and which thus will have reduced disposal problems when it is spent. Other objects will be apparent to those skilled in the art.

STATEMENT OF THE INVENTION

In accordance with certain of its aspects, this invention is directed to a process for converting a charge waxy hydrocarbon distillate of high pour point to a hydrocarbon product of reduced pour point and high viscosity index suitable for use as a lube oil base stock which comprises maintaining a bed of supported catalyst comprising a support containing about 2-50 w % silica and 50-98 w % alumina, bearing 2-10 w % of a non-noble Group VIII metal, as metal, metal oxide, or metal sulfide, about 8-20 w % of a Group VI-B metal, as metal, metal oxide, or metal sulfide, less than 0.5% halogen and 0-2 w % of phosphorus, the atom ratio of Group VIII metal to Group VI-B metal being about 0.3-2:1, said catalyst being characterized by a micropore mode of about 60-130 Å diameter, a Total Surface Area of about 150-300 m$^2$/g, a Total Pore Volume of about 0.45-0.9 cc/g and a Pore Volume of pores with pore diameter >500 Å of about 0.02-0.25 cc/g;

passing charge waxy hydrocarbon distillate of high pour point into contact with said bed of catalyst;

maintaining said bed of catalyst at wax conversion conditions including temperature of 550° F.-900° F., pressure of 300-5000 psig, space velocity LHSV of 0.1-10, and hydrogen feed rate of 500-10,000 SCFB thereby converting said waxy hydro-carbon charge of high pour point to a hydrocarbon product of reduced pour point and high viscosity index suitable for use as a lube oil basestock; and recovering said hydrocarbon product of reduced pour point and high viscosity index suitable for use as a lube oil basestock.

In accordance with certain of its other aspects, this invention is directed to a catalyst characterized by its ability to convert a waxy hydrocarbon distillate of high pour point to a hydrocarbon product of reduced pour point and high viscosity index, suitable for use as a lube oil base stock, which comprises a support containing about 2-50 w % silica and 50-98 w % alumina, bearing 2-10 w % of a non-noble Group VIII metal, as metal, metal oxide, or metal sulfide, about 8-20 w % of a Group VI-B metal, as metal, metal oxide, or metal sulfide, less than 0.5% halogen; and 0-2 w % of phosphorus, the atom ratio of Group VIII metal to Group VI-B metal being about 0.3-2:1, said catalyst being characterized by a micropore mode of about 60-130 Å diameter, a Total Surface Area of about 150-300 m$^2$/g, a Total Pore Volume of about 0.45-0.9 cc/g and a Pore Volume of pores with pore diameter >500 Å of about 0.02-0.25 cc/g.

DESCRIPTION OF THE INVENTION

The waxy hydrocarbon charge which may be treated by the process of this invention includes those which are particularly characterized by a high content of wax—typically at least about 40% and commonly above 55 w % paraffins. These charge compositions contain 40-95 w %, commonly 55-95 w %, say 85 w % paraffins. They may also be characterized by a high pour point—typically above about 80° F., commonly 80° F.-120° F., say 90° F. In the case of slack wax, the pour point may be even higher—say up to 150° F. These stocks may commonly contain sulfur in amount of >100 wppm i.e. greater than 0.01 w %.

These charge hydrocarbons may typically be obtained as side streams from a vacuum tower; and they will commonly not have been subjected to further processing. Charge compositions may also include slack wax or petrolatum recovered from a dewaxing operation, soft wax, wax distillates recovered from non-lube waxy crudes (e.g. Minas, Altamont etc). Other possible feedstocks may include raffinates from solvent refining of wax distillates of high wax content including those recovered during refining with N-methyl pyrrolidone-2, furfural, phenol, etc. It is also possible to treat soft waxes obtained from deoiling of (i) slack wax, (ii) high wax content distillates or (iii) deasphalted oil. Solvent extracted streams such as distillates or deasphalted oils may also be treated by the process of this invention.

It is a feature of the process of this invention that it is particularly adapted to permit operation with non-conventional charge containing much higher wax content (e.g., $\geq 40$ w %) than is present in conventional charge to hydrotreating—which latter charge commonly contains less than about 30 w % wax.

Illustrative specific waxy hydrocarbon charge stocks which may be treated by the process of this invention may include the following:

The support typically may contain 2-50 w %, preferably 8-45 w %, say 18 w % silica and 50-98 w %, preferably 55-92 w %, say 82 w % alumina.

The catalyst which may be employed in the process of this invention may be a supported (on e.g. 18% silica/82% alumina support) catalyst containing:

(i) a non-noble Group VIII metal (Fe, Co, or preferably Ni) in amount of 2-10 w %, preferably 2.4-6.4 w %, say 3 w %

(ii) a Group VI B metal (Cr, W, or preferably Mo) in amount of 8-20 w %, preferably 9-16 w %, say 10.3 w %

(iii) phosphorus in amount less than 2 w %, preferably less than 1, preferably less than 0.1 w %, say 0 w %

(iv) halogen (Cl, Br, I, or F) in amount of less than about 0.5 w %, preferably less than about 0.1 w %, say

TABLE

| Test | A<br>Unrefined<br>Minas 7<br>Dist | B<br>Unrefined<br>Minas 8<br>Dist | C<br>Solvent<br>Ref. Minas 8<br>Dist | D<br>Slack Wax<br>20 | E<br>Slack Wax<br>40 | F<br>Petrolatum | G<br>Soft<br>Wax |
|---|---|---|---|---|---|---|---|
| API Gravity | 35.0 | 31.9 | 33.0 | 38.0 | 36.4 | 31.4 | 34.8 |
| Nitrogen, ppm | 344 | 458 | 56.6 | 18.1 | 29.8 | 231 | 28.4 |
| Sulfur, wt % | 0.08 | 0.2 | 0.102 | 0.05 | 0.37 | 0.32 | 0.026 |
| Wax Content w % | 49.0 | 45.5 | 50.4 | 89.1 | 87.1 | 88.5 | 41.5 |
| Vis. Kin. cSt @ | | | | | | | |
| 65.6° C. | 8.24 | 13.18 | 11.28 | 11.00 | 18.26 | 53.47 | 14.3 |
| 100° C. | 4.01 | 5.76 | 5.24 | 5.36 | 8.19 | 19.17 | 6.23 |
| Pour Point °F. | 130+ | 120 | 120 | 120 | 120+ | 120+ | 80 |
| VI | 129 | 125 | 146 | 179 | 175 | 141 | 132 |
| Visc., SUS @ 100 F | 93 | 163 | 133 | 119 | 211 | 803 | 176 |
| GC TBP F°. | | | | | | | |
| IBP °F. | 548 | 559 | 556 | 654 | 513 | 790 | 668 |
| 10% °F. | 687 | 776 | 773 | 786 | 870 | 931 | 775 |
| 50% °F. | 792 | 848 | 850 | 881 | 968 | 1037 | 877 |
| 90% °F. | 863 | 897 | 902 | 973 | 1031 | 1118 | 952 |
| EP °F. | 923 | 948 | 1336 | 1059 | 1116 | 1178 | 1169 |

It is a feature of the process of this invention that it may be carried out in one or more separate beds in one reactor or in several reactors. In the case of wax distillate charge, the reaction may be carried out in two or more beds after the first of which, diluent (e.g. hydrogen or additional charge hydrocarbon) may be admitted to control the exotherm i.e. to maintain the temperature of the reaction mixture within the noted range. In the case of e.g. slack wax, the exotherm is not normally so large as to require inter-bed cooling or addition of diluent.

The supported catalyst which may be employed in the process of this invention may contain 2-10 w %, preferably 2.4-6.4 w % say 3 w % non-noble Group VIII metal, 8-20 w %, preferably 9-16 w % say 10.3 w % Group VI B metal, 0-2 w % phosphorus (expressed as $P_2O_5$), preferably 0-1, say 0 w % and 0-0.5 w %, preferably 0-0.1 say 0 w % halogen. The total metal content may be 10 w %-30 w %, preferably 12 w %-18 w %, say 13.3 w % of the support. The atomic ratio of Group VIII metal to Group VIB metal is preferably 0.3-2:1, more preferably 0.4-1:1, typically 0.36-0.93:1, say about 0.48:1.

The supported catalyst may contain 0-0.5 w % halogen preferably 0-0.1 w %, more preferably 0 w %. Phosphorus may be present in amount of 0-2 w %, preferably 0-1, say 0 w %. It is a particular feature of the catalysts of this invention that the preferred catalysts contain as little halogen and phosphorus as possible, preferably none.

0 w %.

The silica-alumina supported catalyst which may be employed may be prepared by blending the components prior to extrusion. In this embodiment, the catalyst may be formed by co-extruding a mixture containing an aqueous solution of both Group VIII and VIB metal salts with silica-alumina gel.

It is preferred, however, to prepare the catalyst of the instant invention by impregnation using the incipient wetness technique. The catalyst is prepared by contacting the formed silica-alumina support with an aqueous solution of a water-soluble compound of Group VIII metal and a water soluble compound of Group VIB metal at a temperature of 18°-80° C. Hydrogen peroxide and/or citric acid may be employed to stabilize the impregnating solution. This wet, impregnated support may then be dried at 100° C.-200° C., say about 125° C. for 12-24 hours, say about 18 hours and then calcined at 400°-600° C., say about 543° C. for 0.5-4; say 1 hour.

The catalyst so-prepared is characterized by a Total Surface Area (Brunauer-Emmet-Teller BET) of 150-300 m$^2$/g, preferably 200-280 m$^2$/g, say 249 m$^2$/g.

The Total Pore Volume (TPV) is 0.45-0.9 cc/g, preferably 0.45-0.65 say 0.49 cc/g. The catalyst is particularly characterized by a pore volume of pores with a pore diameter >500 Å of about 0.02-0.25 cc/g, preferably 0.02-0.15, say 0.04 cc/g.

The catalyst is also characterized by a Micropore Mode (i.e. a Mode in the micropore region of 30 Å-250 Å diameter) of 60 Å-130 Å, preferably 70 Å-110 Å, say 73 Å.

Typical catalysts are also characterized by a VI-B metal gradient of 1-2, preferably 1.2-1.4, say 1.2. VI-B metal gradient is defined as w % of VI-B metal with respect to aluminum in the exterior of the catalyst divided by the w % of VI-B metal with respect to aluminum in the interior of the catalyst. The VI-B metal gradient is determined by using X-ray photoelectron spectroscopy (XPS).

In practice of the process of this invention, the waxy hydrocarbon charge of high Pour Point is charged to the bed of catalyst. Reaction conditions include temperature of 550° F.-900° F., preferably 700° F.-800° F., say about 750° F., pressure of 300-5000 psig, preferably about 1000-1500, say about 1000 psig, LHSV of 0.1-10, preferably 0.45-2, say about 0.77, and hydrogen feed rate of 500-10,000, say 2500 SCFB.

Prior to wax conversion the catalyst is sulfided by contact with a stream of hydrogen containing 10 v % hydrogen sulfide for 3 hours at 750° F./40 psig.

During contact with catalyst at the conditions of operation, the hydrocarbon charge is subjected to wax conversion reactions the principal one of which appears to be isomerization of normal paraffins to isoparaffins. The degree of conversion may be measured by the decrease in content of material (i.e. wax) which crystallizes out on chilling in the presence of dewaxing solvent as measured by Test Method ASTM D-3235 or ASTM D-721 or ASTM D-1601, as appropriate.

It is a particular feature of the process of this invention that it is characterized by production of high volume % of 700° F.+ hydrocarbons in the product—typically 45-90 w %, preferably 45-70 w %, say 68 w % and by a high lube oil yield—typically 30-40 w %, preferably about 35-40 w %, say 39.6 w %. (Lube oil yield is estimated by the difference between the volume % of the 700° F.+ fraction and the wax content of the total liquid product).

It is also a particular feature of the process of this invention that these improvements may be attained at a high Reaction Yield—typically above about 25 w % and commonly 40-60 w %, say about 50 w %. (Reaction Yield, or wax-free Lube Yield, is defined as the product of the 700° F.+ bottoms yield in weight % times the oil content weight fraction).

Practice of the process of this invention will be apparent to those skilled in the art from the following examples wherein all parts are parts by weight unless otherwise stated. A control example is indicated by an asterisk (*).

DESCRIPTION OF SPECIFIC EMBODIMENTS

In each example, the catalyst is sulfided by contact with a stream of hydrogen containing 10 v % hydrogen sulfide at 750° F. for 3 hours at 40 psig.

EXAMPLES I-XI

In these Examples, a variety of catalysts are prepared for use in the wax hydroconversion process of this invention. The catalyst of Control Example I* is a commercially available NiWF catalyst and that of control Example II* is a commercially available NiMoF catalyst of Engelhard both believed to be prepared and according to the teaching of EP 0 335 583. The catalyst of Control Example III* is a commercial hydrocracking catalyst sold by AKZO Chemicals under the designation KF-1011. The catalyst of Control Example VI* is the Haldor Topsoe TK-881 catalyst containing 5-10 W % USY zeolite. The catalyst of Control Example VII* was prepared by impregnating an alumina support containing 2 w % silica with NiMoF.

The catalysts of Examples I*, II*, IV* VI* and VII* are control catalysts because they contain more than 0.5 w % halogen. The catalyst of Example III* is a control catalyst because the micropore mode is only 38 Å.

Example V illustrates the best mode presently known of practicing the invention. Examples VIII-XI are specific embodiments of the invention.

In the case of e.g. Example V., the catalyst includes a silica (18 w %)—alumina (82 w %) support which is made by mixing a silica sol with a pseudoboehmite alumina powder and extruding the mix to form cylinder of diameter of one sixteenth inch and length of 0.1-1 inch. The extrudate is dried at 250° F. for 24 hours and calcined at 1000° F. for 5 hours which yields a surface area of 200-300 m²/g.

The support is impregnated with an aqueous solution containing the desired amount of nickel nitrate hexahydrate and ammonium heptamolybdate, dried at 250° F. for 12 hours, and then calcined at 1050° F. for 2 hours. Each impregnating solution may contain 0.5 v % hydrogen peroxide (30 w %) as stabilizing agent and also to enhance the uniformity of the metals distribution on the carrier.

The properties of the catalysts of Examples I-XV are set forth in the following Tables.

TABLE

| | Example No. | | | |
|---|---|---|---|---|
| | I* | II* | III* | IV* |
| Chemical Analysis | | | | |
| Mo wt % | 0 | 9.3 | 7.7 | 10.0 |
| W wt % | 19 | 0 | 0 | 0 |
| Ni wt % | 6 | 3.1 | 3.8 | 2.9 |
| Co wt % | 0 | 0 | 0 | 0 |
| F wt % | 2 | 2 | 0 | 2 |
| P wt % | 0 | 0 | 0 | 0 |
| SiO₂ wt % | 13.5 | 15.4 | — | 18.0 |
| GP VIII/GP VIB Atom Ratio | 0.99 | 0.54 | 0.81 | 0.47 |
| Group VI-B Gradient | 0.6 | 4.6 | — | 1.6 |
| Hg porosimetry Pore Size Dist. cc/g | | | | |
| TPV | 0.38 | 0.44 | 0.29 | 0.51 |
| >500Å | 0.008 | 0.008 | 0.01 | 0.02 |
| >250Å | 0.01 | 0.02 | 0.03 | 0.07 |
| >160Å | 0.02 | 0.02 | 0.03 | 0.09 |
| <160Å | 0.35 | 0.42 | 0.26 | 0.42 |
| <100Å | 0.32 | 0.40 | 0.26 | 0.36 |
| 100-160Å | 0.03 | 0.02 | 0.01 | 0.04 |
| Micropore Mode, Å | 95 | 87 | 73 | 64 |
| Multiple-Point BET | | | | |
| Surface Area m²/g | 154 | 189 | 298 | 197 |
| Micropore Mode Å | 99 | 75 | 38 | 62 |

| | Example No. | | |
|---|---|---|---|
| | V | VI* | VII* |
| Chemical Analysis | | | |
| Mo wt % | 10.3 | 10.3 | 14.0 |
| W wt % | 0 | 0 | 0 |
| Ni wt % | 3.0 | 3.0 | 5.0 |
| Co wt % | 0 | 0 | 0 |
| F wt % | 0 | 2 | 3.2 |
| P wt % | 0 | 0 | 0 |
| SiO₂ wt % | 18.0 | 3.0 | 2.0 |
| GP VIII/GP VIB Atom Ratio | 0.48 | 0.48 | 0.54 |
| Group VI-B Gradient | 1.2 | 1.2 | 7.9 |
| Hg porosimetry Pore Size Dist. cc/g | | | |
| TPV | 0.50 | 0.54 | 0.65 |
| >500Å | 0.05 | 0.003 | 0.05 |
| >250Å | 0.04 | 0.07 | 0.13 |
| >160Å | 0.05 | 0.17 | 0.16 |

TABLE-continued

| | | | |
|---|---|---|---|
| <160Å | 0.45 | 0.37 | 0.49 |
| <100Å | 0.41 | 0.06 | 0.31 |
| 100-160Å | 0.04 | 0.31 | 0.18 |
| Micropore Mode, Å | 73 | 136 | 91 |
| Multiple-Point BET | | | |
| Surface Area m²/g | 249 | 157 | 202 |
| Micropore Mode Å | 62 | 115 | 81 |

| | Example No. | | | |
|---|---|---|---|---|
| | VIII | IX | X | XI |
| Chemical Analysis | | | | |
| Mo wt % | 11.2 | 16.2 | 10.6 | 11.2 |
| W wt % | 0 | 0 | 0 | 0 |
| Ni wt % | 2.5 | 2.5 | 2.5 | 2.5 |
| Co wt % | 0 | 0 | 0 | 0 |
| F wt % | 0 | 0 | 0 | 0 |
| P wt % | 0 | 0 | 0 | 0 |
| SiO₂ wt % | 16.0 | 8.1 | 16.0 | 8.0 |
| GPVIII/GP VIB Atomic Ratio | 0.36 | 0.36 | 0.93 | 0.93 |
| Group VI-B Gradient | 1.4 | 1.4 | 1.2 | 1.2 |
| Hg porosimetry Pore Size Dist. cc/g | | | | |
| TPV | 0.54 | 0.52 | 0.50 | 0.54 |
| >500Å | 0.02 | 0.02 | 0.02 | 0.02 |
| >250Å | 0.03 | 0.03 | 0.02 | 0.02 |
| >160Å | 0.03 | 0.04 | 0.03 | 0.03 |
| <160Å | 0.51 | 0.48 | 0.48 | 0.51 |
| <100Å | 0.48 | 0.26 | 0.45 | 0.38 |
| 100-160Å | 0.03 | 0.22 | 0.03 | 0.13 |
| Micropore Mode, Å | 83 | 108 | 80 | 101 |
| Multiple-Point BET | | | | |
| Surface Area m²/g | 264 | 215 | 238 | 233 |
| Micropore Mode Å | 73 | 98 | 74 | 96 |

| | Example No. | | | |
|---|---|---|---|---|
| | XII | XIII | XIV | XV |
| Chemical Analysis | | | | |
| Mo wt % | 11.2 | 11.2 | 9.8 | 9.8 |
| W wt % | 0 | 0 | 0 | 0 |
| Ni wt % | 2.5 | 2.5 | 2.5 | 2.5 |
| Co wt % | 0 | 0 | 0 | 0 |
| F wt % | 0 | 0 | 0 | 0 |
| P wt % | 0 | 0 | 0 | 0 |
| SiO₂ wt % | 12.0 | 14.2 | 0.42 | 45.0 |
| GPVIII/GP VIB Atomic Ratio | 0.36 | 0.36 | 0.93 | 0.93 |
| Group VI-B Gradient | — | — | 1.1 | — |
| Hg Porosimetry Pore Size Dist. cc/g | | | | |
| TPV | 0.54 | 0.52 | 0.79 | 0.78 |
| >500Å | 0.02 | 0.02 | 0.15 | 0.22 |
| >250Å | 0.03 | 0.03 | 0.26 | 0.24 |
| >160Å | 0.03 | 0.04 | 0.33 | 0.28 |
| <160Å | 0.51 | 0.48 | 0.47 | 0.45 |
| <100Å | 0.48 | 0.26 | 0.22 | 0.38 |
| 100-160Å | 0.03 | 0.22 | 0.25 | 0.07 |
| Micropore Mode, Å | 83 | 108 | 79 | 101 |
| Multiple-Point BET | | | | |
| Surface Area m²/g | 264 | 215 | 193 | 298 |
| Micropore Mode Å | 73 | 98 | 68 | 65 |

In each example, the catalysts were tested in a Berty Reactor System charging slack wax 20 (of column D of the Charge Table supra) which contains 89.1 w % wax. The conditions of operation are as follows:

TABLE

| Condition | Value |
|---|---|
| Temperature (°F.) | 650-775 |
| Feed Charge Rate (cc/hr) | 50 |
| LHSV | 0.4 |
| Catalyst Volume (cc) | 65 |
| Total Pressure (psig) | 1000 |
| Hydrogen Feed Rate (SCFB) | 1450 |

The wax content, wax conversion, and volume percent of the fraction boiling above 700° F. are averages of a plurality of sample cuts at each reactor temperature. The reactor yield of volume % boiling above 700° F. fraction is calculated from the difference between the volume % of the 700° F.+ fraction and the wax content of the Total Liquid Product TLP. The Lube Oil Yield w % is based on the premise that all of the unconverted wax feed is present in the 700° F. fraction.

The results attained are set forth in the following Table:

TABLE

| Example | Temp., °F. | Wax Cont. wt % | Wax Conv. % | Vol % of 700 F+ | Reactor Lube Oil Yield, wt % |
|---|---|---|---|---|---|
| I* | 750 | 12.6 | 85.0 | 42.1 | 29.5 |
| | 775 | 6.0 | 92.8 | 23.1 | 17.1 |
| II* | 725 | 39.7 | 52.0 | 75.1 | 36.5 |
| | 750 | 23.0 | 72.6 | 58.1 | 35.1 |
| | 775 | 9.5 | 88.7 | 33.1 | 23.6 |
| III* | 725 | 16.8 | 80.0 | 21.7 | 8.7 |
| | 750 | 13.3 | 84.1 | 25.5 | 8.4 |
| IV* | 700 | 19.6 | 79.6 | 35.0 | 15.5 |
| | 725 | 14.1 | 83.2 | 25.3 | 11.2 |
| V | 700 | 28.4 | 66.2 | 68.0 | 39.6 |
| | 725 | 17.8 | 78.8 | 48.9 | 31.1 |
| VI* | 700 | 41.0 | 51.1 | 48.0 | 7.0 |
| | 725 | 34.5 | 58.8 | 46.2 | 11.7 |
| VII* | 725 | 26.3 | 68.7 | 47.2 | 20.9 |
| | 750 | 13.3 | 84.1 | 29.3 | 16.0 |
| VIII | 700 | 44.5 | 46.9 | 81.3 | 36.7 |
| | 725 | 35.2 | 63.6 | 65.2 | 34.7 |
| IX | 725 | 50.8 | 39.3 | 86.3 | 35.5 |
| | 750 | 32.9 | 60.7 | 68.4 | 35.5 |
| X | 700 | 30.5 | 63.7 | 68.4 | 37.9 |
| | 725 | 19.1 | 77.2 | 52.2 | 33.1 |
| XI | 700 | 49.0 | 41.5 | 85.2 | 36.2 |
| | 725 | 45.2 | 46.0 | 80.9 | 35.7 |
| | 750 | 23.0 | 72.6 | 55.7 | 32.7 |

From the above Table, it is apparent that Example V of this invention gives the highest Lube Oil Yield: 39.6 w %. It is particularly to be noted that this was attained at a low temperature of 700° F. In contrast, the best control (Example II*) only gave a Lube Oil Yield of 36.5 w % at 725° F. which temperature is 25° F. higher than that of Experimental Example V.

A comparison of Example V with control Example IV* shows that presence of 2 w % fluorine caused a penalty of 20-30 w % to the Lube Oil Yield.

Example III* shows a much lower Lube Oil Yield at 725° F. (8.7 w %) as compared to 31.1 w % of Example V. Example III* does not yield a satisfactory catalyst for the conversion of slack wax to lube oils.

Examples VIII-XI of this invention show the effect of preparation parameters on the Wax Conversion and Lube Oil Yield. The hydrogenation and cracking functionalities were adjusted by varying the active metal combination, the Ni/Mo weight ratio, and the silica content of the catalyst.

It will be seen that the Wax Conversion of the preferred Ni/Mo catalyst (Example V) was higher than that of the Co/Mo catalyst (Example VIII). Increasing the Ni/Mo ratio resulted in an increase in Wax Conversion activity (compare Examples XI and IX). An increase in silica content of the support showed an increase in Wax Conversion Activity. (Note Examples XI and X.

It is apparent from the above Table of Activity that the catalysts of this invention (particularly that of Example V) provide Lube Oil Yield which is unexpectedly superior to that of control prior art catalysts. Furthermore, the catalysts of this invention which contain halogen (typically <0.5 w %) in very small quantities, preferably 0%, are not characterized by the regeneration and reactivation problems which undesirably characterize the control catalysts which contain fluorine. Control fluorine-containing catalysts typically are regenerated by burning off coke; and this is accompanied by decomposition which liberates fluorine-containing gases (including HF) which are environmentally undesirable. Clearly this raises further environmental problems in that reactivation of the catalysts also requires replenishment of the fluorine content by reaction with NH$_4$F or an organic fluoriding agent such as difluoroethane.

In order to determine the ability of the catalysts of this invention over runs of longer duration, certain catalysts (those of Examples V, XIV, XIII, and IX) were run at the same conditions as were employed in Examples I–XV—but for a period of two days—48 hours. The space volume LHSV and temperature were also varied to determine the impact of these factors on the reaction as measured by Lube Oil Yield, Volume % of 700° F.+ fraction, are Wax Conversion.

From the above table, it is clear that Example V (the best mode) shows highest Wax Conversion (79.8%) at 725° F. at high Lube Oil Yield (32.1%). Compare for example this run with Example XIII wherein at a significantly high temperature (750° F.) a Wax Conversion of only 69.7% is attained.

Additional runs were carried out over a five-day period.

TABLE
EVALUATION OF SLACK WAX CONVERSION CATALYSTS

| Catalysts of Example | Ratio Group VIII: Mo | LHSV | Temp. °F. | Wax Content Wt % | Wax Conv. % | Vol. % of 700 F+ | Lube Oil Yield Wt % |
|---|---|---|---|---|---|---|---|
| (Five-Day Runs) | | | | | | | |
| VIII | 0.35 | 0.40 | 725 | 35.3 | 57.9 | 70.5 | 35.2 |
|  |  | 0.40 | 750 | 17.5 | 79.1 | 42.2 | 24.7 |
| IX | 0.36 | 0.40 | 700 | 45.0 | 46.3 | 83.6 | 38.6 |
|  |  | 0.38 | 725 | 29.3 | 65.1 | 67.1 | 37.8 |
|  |  | 0.38 | 750 | 16.6 | 80.2 | 39.0 | 22.4 |
| X | 0.93 | 0.38 | 750 | 37.2 | 55.6 | 69.6 | 32.4 |
|  |  | 0.35 | 775 | 19.8 | 76.4 | 43.3 | 23.5 |
| XI | 0.93 | 0.38 | 750 | 32.1 | 61.7 | 67.3 | 35.1 |
|  |  | 0.33 | 775 | 19.8 | 76.4 | 43.3 | 23.5 |
| XIII | 0.36 | 0.35 | 725 | 43.0 | 48.7 | 79.8 | 36.8 |
|  |  | 0.32 | 750 | 30.7 | 63.3 | 64.2 | 33.4 |
| XIV | 0.36 | 0.32 | 725 | 36.8 | 56.0 | 74.5 | 37.7 |
|  |  | 0.32 | 750 | 22.9 | 72.7 | 57.3 | 34.4 |

From the above Table, it will be apparent that over five days, the results attained are comparable to those attained over two days. For example, Example XIII shows that at 725° F., the results attained over five days are not significantly different from those obtained after two days. It will be apparent that, at reaction temperatures greater than 750° F., lube oil yields becomes undesirably low for this slack wax 20 feedstock. Over the temperature range 700°–750° F., Examples XIII–XIV show less sensitivity to reaction temperatures for their lube oils yields.

From the following Table, it may be noted that in Example V, it is possible to attain high DWO Yield (dewaxed oil yield) at 725° F. which is comparable to the DWO Yield of Example I* obtained at 750° F.

TABLE
EVALUATION OF SLACK WAX CONVERSION CATALYSTS

| Catalysts of Example | Ratio Group VIII: Mo | LHSV | Temp. °F. | Wax Content Wt % | Wax Conv. % | Vol. % of 700 F+ | Lube Oil Yield Wt % |
|---|---|---|---|---|---|---|---|
| (Two-Day Runs) | | | | | | | |
| V | 0.48 | 0.40 | 700 | 27.7 | 66.9 | 60.7 | 33.0 |
|  |  | 0.40 | 725 | 16.9 | 79.8 | 65.1 | 32.1 |
| XIV | 0.36 | 0.41 | 700 | 45.5 | 45.7 | 81.0 | 35.5 |
|  |  | 0.44 | 725 | 36.9 | 56.3 | 73.3 | 36.4 |
|  |  | 0.38 | 750 | 30.0 | 64.2 | 67.1 | 37.1 |
| XIII | 0.35 | 0.42 | 701 | 53.1 | 36.7 | 84.8 | 31.7 |
|  |  | 0.42 | 725 | 44.0 | 47.5 | 81.0 | 36.9 |
|  |  | 0.37 | 750 | 25.4 | 69.7 | 63.0 | 37.6 |
| IX | 0.35 | 0.42 | 725 | 50.8 | 39.3 | 86.3 | 35.5 |
|  |  | 0.44 | 750 | 32.9 | 60.7 | 68.4 | 35.5 |

TABLE
PROPERTIES OF DEWAXED OILS OBTAINED FROM FIVE-DAY RUNS

| Catalyst of Example | Reactor Temp. °F. | Fraction of 700 F +, Vol % | Viscosity Index (VI) | Pour Point, F. | DWO Yield wt % |
|---|---|---|---|---|---|
| V | 725 | 53.7 | 147 | 10 | 56.9 |
| XIV | 725 | 74.5 | 147 | 7 | 52.9 |
|  | 750 | 57.3 | 137 | 7 | 60.2 |

TABLE-continued
PROPERTIES OF DEWAXED OILS OBTAINED FROM FIVE-DAY RUNS

| Catalyst of Example | Reactor Temp. °F. | Fraction of 700 F +, Vol % | Viscosity Index (VI) | Pour Point, F. | DWO Yield wt % |
|---|---|---|---|---|---|
| XIII | 725 | 79.8 | 141 | 5 | 50.0 |
|  | 750 | 64.2 | 139 | 1 | 46.3 |
| IX | 700 | 83.6 | 140 | −4 | 29.0 |
|  | 725 | 67.1 | 120 | 7 | 49.0 |
|  | 750 | 39.0 | 96 | 5 | 32.8 |
| X | 750 | 69.6 | 139 | 12 | 52.9 |
|  | 775 | 54.8 | 139 | 12 | 49.5 |
| VIII | 725 | 70.5 | 132 | 7 | NA |
|  | 750 | 42.2 | 138 | 12 | NA |
| I* | 750 | 61.0 | 150 | 10 | 57.0 |
| II* | 750 | 58.5 | 147 | 5 | 55.0 |

Although this invention has been illustrated by reference to specific embodiments, it will be apparent to those skilled in the art that various changes and modifications may be made which clearly fall within the scope of the invention.

What is claimed:

1. The process for converting a charge waxy hydrocarbon distillate of high pour point to a hydrocarbon product of reduced pour point and high viscosity index suitable for use as a lube oil base stock which comprises
    maintaining a bed of supported catalyst comprising a support containing about 2–18 w % silica and 32–98 w % alumina, bearing 2–10 w % of a non-noble Group VIII metal, as metal, metal oxide, or metal sulfide, about 8–20 w % of a Group VI-B metal, as metal, metal oxide, or metal sulfide, less than 0.5 w % halogen; and 0–2 w % of phosphorus, the atom ratio of Group VIII metal to Group VI-B metal being about 0.3–2:1, said catalyst being characterized by a micropore mode of about 60–130 Å diameter, a Total Surface Area of about 150–300 m²/g, a Total Pore Volume of about 0.45–0.9 cc/g and a Pore Volume of pores with pore diameter >500 Å of about 0.02–0.25 cc/g;
    passing charge waxy hydrocarbon distillate of high pour point into contact with said bed of catalyst;
    maintaining said bed of catalyst at wax conversion conditions including temperature of 700° F. to 800° F., pressure of 300–5000 psig, space velocity LHSV of 0.1–10, and hydrogen feed rate of 500–10,000 SCFB thereby converting said waxy hydrocarbon charge of high pour point to a hydrocarbon product of reduced pour point and high viscosity index suitable for use as a lube oil base stock; and
    recovering said hydrocarbon product of reduced pour point and high viscosity index suitable for use as a lube oil base stock.

2. The process for converting a charge waxy hydrocarbon distillate of high pour point to a hydrocarbon product of reduced pour point and high viscosity index suitable for use as a lube oil base stock as claimed in claim 1 wherein said catalyst is characterized by a Micropore Mode in the 30 Å–250 Å diameter range of 60 Å–130 Å.

3. The process for converting a charge waxy hydrocarbon distillate of high pour point to a hydrocarbon product of reduced pour point and high viscosity index suitable for use as a lube oil base stock as claimed in claim 1 wherein said catalyst is characterized by a VI-B metal gradient of 1–2.

4. The process for converting a charge waxy hydrocarbon distillate of high pour point to a hydrocarbon product of reduced pour point and high viscosity index suitable for use as a lube oil basestock as claimed in claim 1 wherein said non-noble Group VIII metal is nickel.

5. The process for converting a charge waxy hydrocarbon distillate of high pour point to a hydrocarbon product of reduced pour point and high viscosity index suitable for use as a lube oil basestock as claimed in claim 1 wherein said Group VI-B metal is molybdenum.

6. The process for converting a charge waxy hydrocarbon distillate of high pour point to a hydrocarbon product of reduced pour point and high viscosity index suitable for use as a lube oil basestock as claimed in claim 1 wherein said charge waxy hydrocarbon distillate is a slack wax.

7. The process for converting a charge waxy hydrocarbon distillate of high pour point to a hydrocarbon product of reduced pour point and high viscosity index suitable for use as a lube oil base stock which comprises
    maintaining a bed of supported catalyst comprising a support containing about 8–18 w % silica and 32–92 w % alumina, bearing 2.4–6.4 w % of a non-noble Group VIII metal, as metal, metal oxide, or metal sulfide, about 9–16 w % of a Group VI-B metal, as metal, metal oxide, or metal sulfide; less than 0.5% halogen; and 0–1 w % of phosphorus, the atom ratio of Group VIII metal to Group VI-B metal being about 0.4–1:1, said catalyst being characterized by a micropore mode of about 60–130 Å diameter, a Total Surface Area of about 200–280 m²/g, a Total Pore Volume of about 0.45–0.65 cc/g and a Pore Volume of pores with pore diameter >500 Å of about 0.02–0.15 cc/g;
    passing charge waxy hydrocarbon distillate of high pour point into contact with said bed of catalyst;
    maintaining said bed of catalyst at wax conversion conditions including temperature of 700° F.–800° F., pressure of 300–5000 psig, space velocity LHSV of 0.1–10, and hydrogen feed rate of 500–10,000 SCFB thereby converting said waxy hydrocarbon charge of high pour point to a hydrocarbon product of reduce pour point and high viscosity index suitable for use as a lube oil base stock; and
    recovering said hydrocarbon product of reduced pour point and high viscosity index suitable for use as a lube oil base stock.

* * * * *